United States Patent [19]

Siozaki

[11] 4,135,196

[45] Jan. 16, 1979

[54] GROOVED CHARGING ELECTRODE IN AN INK JET SYSTEM PRINTER

[75] Inventor: Fumio Siozaki, Yamatokoriyama, Japan

[73] Assignee: Sharp Kabushiki Kaisha, Osaka, Japan

[21] Appl. No.: 835,207

[22] Filed: Sep. 21, 1977

[30] Foreign Application Priority Data

Sep. 22, 1976 [JP] Japan ............................ 51/128209
Sep. 27, 1976 [JP] Japan ............................ 51/130160

[51] Int. Cl.$^2$ ............................ G01D 15/18
[52] U.S. Cl. ............................ 346/75
[58] Field of Search ............................ 346/75

[56] References Cited

U.S. PATENT DOCUMENTS

| | | | |
|---|---|---|---|
| 3,657,599 | 4/1972 | Kashio | 346/75 X |
| 3,673,601 | 6/1972 | Hertz | 346/75 |
| 3,786,516 | 1/1974 | Kashio | 346/75 |

*Primary Examiner*—George H. Miller, Jr.
*Attorney, Agent, or Firm*—Birch, Stewart, Kolasch and Birch

[57] ABSTRACT

The inner surface of a charging tunnel for use in an ink jet system printer is tapped. Openings are provided at the bottom surface of the charging tunnel and porous material is provided in such a manner as to surround the charging tunnel.

16 Claims, 14 Drawing Figures

GROOVED CHARGING ELECTRODE IN AN INK JET SYSTEM PRINTER

BACKGROUND OF THE INVENTION

The present invention relates to an ink jet system printer and, more particularly, to a charging electrode in an ink jet system printer.

Generally, there are two types of ink jet system printers. One is the charge amplitude controlling type, and the other is the deflection field controlling type.

In an ink jet system printer of the charge amplitude controlling type, a stream of ink droplets having a given frequency is emitted from a nozzle toward a record receiving paper and each ink droplet is charged to a desired amplitude in accordance with a video signal through the use of a charging electrode. Each ink droplet is deflected as it passes through a fixed high voltage field established by a pair of deflection plates in accordance with the charge amplitude carried thereon and deposited at a desired position on the record receiving paper.

In an ink jet system printer of the deflection field controlling type, uniformly charged ink droplets are propelled from a nozzle toward a record receiving paper through the use of an acceleration electrode. The deflection field is varied in accordance with print information to deflect the ink droplets by desired magnitudes.

In the above-mentioned types of ink jet system printers, ink mist is inevitably created when the ink droplets impinge on the record receiving paper or when the ink droplets are formed from a solid stream of ink ejected from the nozzle. There is a possibility that the ink mist will become attached to the inner surface of the charging electrode or the acceleration electrode confronting the stream of the ink droplets. When the ink mist attached to the inner surface of the charging electrode or the acceleration electrode accumulates to become an ink drop, the ink drop damages the accurate charge operation. Moreover, when the thus created ink drop becomes large, there is a possibility that the ink droplets emitted from the nozzle will come into collision with the ink drop attached to the inner surface of the charging electrode or the acceleration electrode.

OBJECTS AND SUMMARY OF THE INVENTION

Accordingly, an object of the present invention is to provide a novel charging electrode in an ink jet system printer.

Another object of the present invention is to provide a charging electrode for use in an ink jet system printer which can minimize affection caused by ink mist created in the ink jet system printer.

Still another object of the present invention is to stabilize charge operation in an ink jet system printer of the charge amplitude controlling type.

Yet another object of the present invention is to enhance reliability of an ink jet system printer of the charge amplitude controlling type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a charging tunnel is provided for charging ink droplets in accordance with a video signal. The inner surface of the charging tunnel is tapped to provide grooves. In a preferred form, openings are formed at the bottom surface of the charging tunnel and porous material is provided in such a manner as to surround the charging tunnel.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
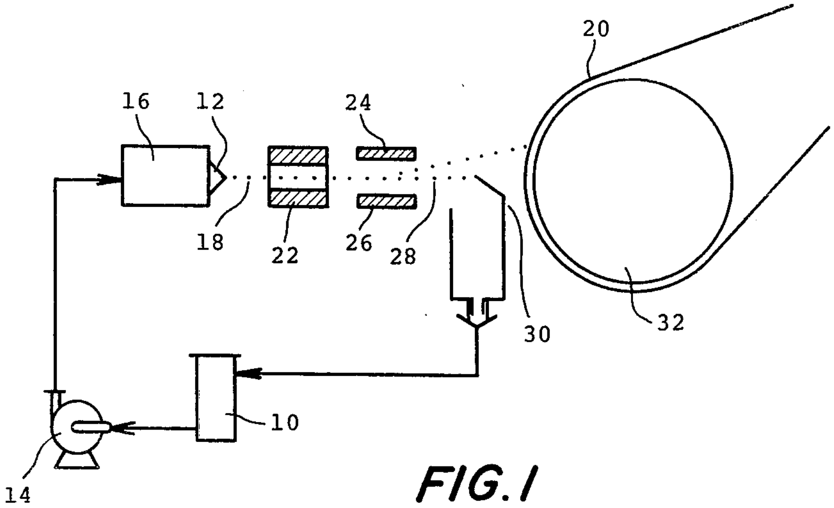
FIG. 1 is a schematic sectional view of an ink jet system printer of the charge amplitude controlling type.

Referring now to the drawings, and to facilitate an understaning of the present invention, the principles of operation of an ink jet system printer of the charge amplitude controlling type will be first described with reference to FIG. 1.

Ink liquid contained within an ink reservoir 10 is sent under pressure to a nozzle 12 through a pump 14. The nozzle 12 is held by an ink droplet issuance unit including an electromechanical transducer 16 such as a piezovibrator. The ink liquid issuing from the nozzle 12 is excited by the electromechanical transducer 16 so that ink droplets 18 of a uniform mass and of a frequency equal to the exciting signal frequency, for example, 50KHz are formed. The ink droplets 18 are directed toward a recording paper 20 at a velocity of about 20 m/sec. The individual ink droplets 18 are charged in response to printing information to selected amplitudes with the use of a charging tunnel 22 in a known manner, and are deflected in accordance with the amplitude of charges on the droplets as they pass over a constant high-voltage electric field established by a pair of high-voltage deflection electrodes 24 and 26. The droplets are then deposited on the recording paper 20 in order to record a desired symbol. Ink droplets 28, not contributive to writing operation, are directed to a beam gutter 30 in order to recirculate waste ink liquid to the ink reservoir 10.

The recording paper 20 is supported by a platen 32 and is driven to travel in the vertical direction when the printing of one line is completed. The nozzle 12 supported by the ink droplet issuance unit is driven to travel in the horizontal direction at a constant speed, and the ink droplets are deflected in the vertical direction as they pass through the constant high-voltage electric field established by the pair of the high-voltage deflection electrodes 24 and 26. Accordingly, the printing is performed in the dot matrix fashion through the use of the deflected ink droplets.

The charge operation is conducted when the ink droplet separates from a solid stream of ink emitted from the nozzle 12. When the charging tunnel 22 is connected to receive a charging signal of negative voltages and the nozzle 12 is grounded, the ink droplets 18 bear the charges of positive voltages in accordance with the level of the charging signal.

Since the ink droplets 18 are emitted from the nozzle 12 at a velocity of 20 m/sec, after the ink droplets 18 and 28 impinge upon the recording paper 20 and the beam gutter 30, a part of the ink droplets is broken into particles of ink mist which are diffused in various directions. When such particles of ink mist attach to the inner surface of the charging electrode 22, there is a possibility that the system will be erroneously broken down or the charge operation not desirably achieved because the particles of ink mist gather to form an ink drop.

Moreover, when the thus created ink drop becomes large, there is a possibility that the ink droplets emitted from the nozzle will come into collision with the ink drop attached to the inner surface of the charging tunnel 22.

Figure 2:
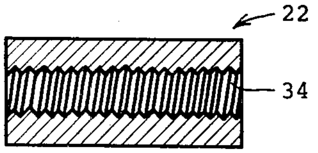
FIG. 2 is a sectional view of an embodiment of a grooved charging electrode of the present invention.
Figure 3:
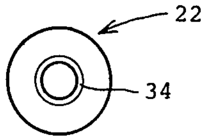
FIG. 3 is a side view of the grooved charging electrode of FIG. 2.
Figure 4A:
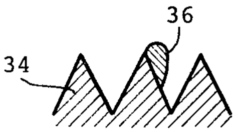
FIGS. 4(A) through 4(D) are sectional views for explaining operation of the grooved charging electrode of FIG. 2.
Figure 4B:
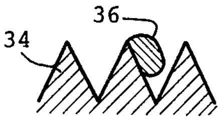
Figure 4C:
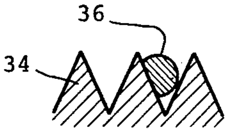
Figure 4D:
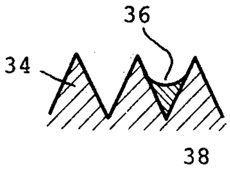

FIGS. 2 and 3 show an embodiment of a charging tunnel of the present invention, which can eliminate the above-mentioned erroneous operation.

The inner surface of the charging tunnel 22 is tapped to provide grooves 34. When the ink mist attached to the inner surface of the charging tunnel 22 gathers to become an ink drop 36, the ink drop 36 flows along the inclination of the grooves 34 and is retained at the root of thread 38 as shown in FIGS. 4(A) through 4(D). Accordingly, the ink drop 36 will not affect the accurate charge operation.

Figure 5A:
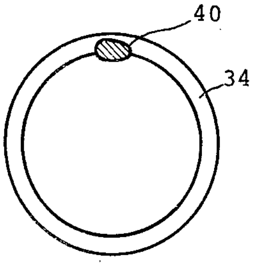
FIGS. 5(A) through 5(C) are side views for explaining operation of the grooved charging electrode of FIG. 2.
Figure 5B:
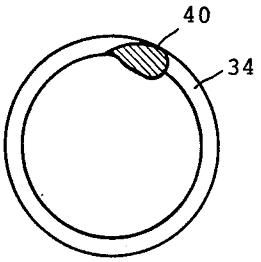
Figure 5C:
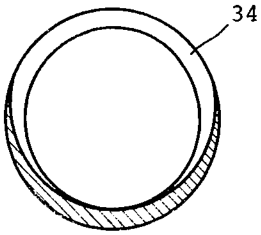

FIGS. 5(A) through 5(C) show behavior of an ink drop 40 created at the upper portion of the inner surface of the charging channel 22. The ink drop 40 flows along the grooves 34 toward the bottom portion of the inner surface of the charging tunnel 22 and is retained near the bottom portion of the inner surface of the charging tunnel 22 as shown in FIG. 5(C).

Figure 6:
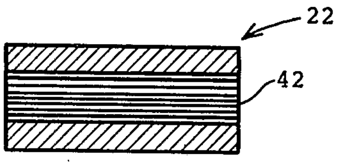
FIG. 6 is a sectional view of another embodiment of a grooved charging electrode of the present invention.
Figure 7:
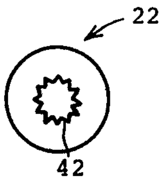
FIG. 7 is a side view of the grooved charging electrode of FIG. 6.

FIGS. 6 and 7 show another embodiment of the grooved charging tunnel of the present invention. Grooves 42 are formed in a parallel fashion to the passage of the ink droplets through the use of a spline hob.

The grooves 34 and 42 function to catch dust drifting in the air, whereby occurrence of missing dots due to the dust can be eliminated.

Figure 8:
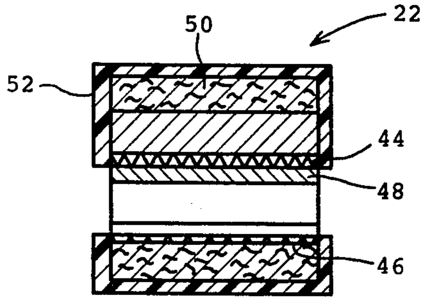
FIG. 8 is a sectional view of still another embodiment of a grooved charging electrode of the present invention.
Figure 9:
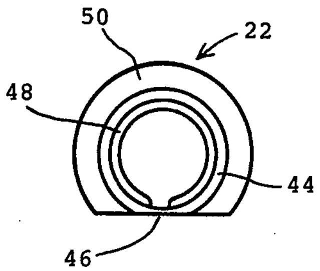
FIG. 9 is a side view of the grooved charging electrode of FIG. 8.

FIGS. 8 and 9 show still another embodiment of the charging tunnel of the present invention.

The inner surface of the charging tunnel 22 is tapped to form grooves 44 as the charging tunnel of FIGS. 2 and 3. The bottom portion of the charging tunnel is cut away to provide openings 46 at the roots of thread. A stainless steel mesh film 48 is secured along the inner surface of the charging tunnel 22 to enhance the collection of the ink mist. Porous material 50 is disposed along the periphery of the charging tunnel and secured by a case 52 made of resin. The case 52 is omitted in FIG. 9 for the purpose of simplicity.

The porous material 50 is exposed to the inner environment of the charging tunnel at the openings 46 in order to enhance the collection of ink liquid captured within the grooves 44.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In combination with an ink jet system printer which emits charged ink droplets from a nozzle toward a record receiving member through the use of a charging means, and selectively deflects said ink droplets by deflection means and records desired symbols on said record receiving member with said selectively deflected ink droplets, said charging means comprising:

a charging electrode having a surface confronting the passage of said ink droplets; and grooves formed on said surface of the charging electrode confronting the passage of said ink droplets, said surface being parallel to said passage of said ink droplets.

2. The combination of claim 1, wherein said grooves are substantially perpendicular to the passage of said ink droplets.

3. The combination of claim 1, wherein said grooves are substantially parallel to the passage of said ink droplets.

4. An ink jet system printer of the charge amplitude controlling type wherein an ink stream emitted from a nozzle having a vibrator is broken into ink droplets at a given vibration frequency, and the individual ink droplets, charged by a charging means in accordance with a video signal, are deflected in accordance with the amplitude of charges carried thereon as they pass through a constant high-voltage electric field established by deflection means, thereby printing desired symbols on a record receiving member, said charging means comprising:

a charging tunnel having an inner circular surface confronting the passage of said ink droplets; and grooves formed on said inner circular surface of the charging tunnel.

5. The ink jet system printer of the charge amplitude controlling type of claim 4, which further comprises:

porous material secured around said charging tunnel; and openings formed in the inner circular surface of said charging tunnel to expose the porous material to the inner environment of said charging tunnel.

6. The ink jet system printer of the charge amplitude controlling type of claim 4, wherein said grooves are formed through the use of a spline hob.

7. The combination of claim 4, wherein said grooves are substantially parallel to the passage of said ink droplets.

8. The ink jet system printer of the charge amplitude controlling type of claim 4, which further comprises openings formed at the bottom portion of said inner surface of said charging tunnel.

9. The ink jet system printer of the charge amplitude controlling type of claim 8, wherein said grooves are formed by tapping said inner circular surface of said charging tunnel, and said openings are formed by cutting away the roots of thread.

10. The ink jet system printer of the charge amplitude controlling type of claim 4, wherein said grooves are substantially perpendicular to the passage of said ink droplets.

11. The ink jet system printer of the charge amplitude controlling type of claim 10, wherein said grooves are formed by tapping the inner circular surface of said charging tunnel.

12. The ink jet system printer of the charge amplitude controlling type of claim 11, which further comprises:

porous material secured around said charging tunnel; and openings formed in the inner circular surface of said charging tunnel to expose the porous material to the inner environment of said charging tunnel.

13. The ink jet system printer of the charge amplitude controlling type of claim 12, which furhter comprise a stainless steel mesh film secured along said inner surface of said charging tunnel.

14. An ink jet system printer of the charge amplitude controlling type wherein an ink stream emitted from a nozzle having a vibrator is broken into ink droplets at a given vibration frequency, and the individual ink droplets, charged by a charging means in accordance with a video signal, are deflected in accordance with the amplitude of charges carried thereon as they pass through a constant high-voltage electric field established by deflection means, thereby printing desired symbols on a record receiving member, said charging means comprising:

a charging electrode having a surface confronting the passage of said ink droplets, said surface being parallel to said passage; and grooves formed on said surface of the charging electrode.

15. The combination of claim 14, wherein said grooves are substantially perpendicular to the passage of said ink droplets.

16. The combination of claim 14, wherein said grooves are substantially parallel to the passage of said ink droplets.

* * * * *